United States Patent
Rune

(10) Patent No.: US 8,862,099 B2
(45) Date of Patent: Oct. 14, 2014

(54) METHOD, APPARATUS, AND SYSTEM FOR DETECTING ALLOWED CLOSED SUBSCRIBER GROUP CELLS (CSG)

(75) Inventor: Johan Rune, Lidingö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 13/260,024

(22) PCT Filed: Mar. 25, 2009

(86) PCT No.: PCT/SE2009/050311
§ 371 (c)(1),
(2), (4) Date: Sep. 23, 2011

(87) PCT Pub. No.: WO2010/110706
PCT Pub. Date: Sep. 30, 2010

(65) Prior Publication Data
US 2012/0021725 A1    Jan. 26, 2012

(51) Int. Cl.
*H04M 3/16* (2006.01)
*H04W 48/16* (2009.01)

(52) U.S. Cl.
CPC .................................. *H04W 48/16* (2013.01)
USPC ........ 455/411; 455/420; 455/421; 455/435.2; 455/436; 370/328; 370/331; 370/332

(58) Field of Classification Search
CPC .................................................. H04W 48/16
USPC ......... 455/411, 436, 466, 518–519, 567, 416, 455/557, 556.1, 556, 450, 423, 67.11, 455/435.2, 444, 424, 509, 440; 370/328–338, 259, 252, 350
See application file for complete search history.

(56) References Cited

U.S. PATENT DOCUMENTS

2008/0267153 A1*  10/2008  Mukherjee et al. ........... 370/338
2012/0015681 A1*   1/2012  Dalsgaard et al. ............ 455/517

FOREIGN PATENT DOCUMENTS

WO    2009/117658 A1    9/2009

OTHER PUBLICATIONS

3rd Generation Partnership Project. 3GPP TS 36.300, V8.7.0 (Dec. 2008), 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8). Dec. 2008.
3rd Generation Partnership Project. "CSG cell (re-)selection an physical CSG cell identification." 3GPP TSG RAN WG2 #63, R2-084349, Jeju, Korea, Aug. 18-22, 2008.
3rd Generation Partnership Project. "Need for PCT CSG to be known in the UE." 3GPP TSG RAN2 Meeting #63bis, R2-085663, Prague, Czech Republic, Sep. 29-Oct. 3, 2008.

* cited by examiner

*Primary Examiner* — Babar Sarwar
(74) *Attorney, Agent, or Firm* — Coats & Bennett, PLLC

(57) ABSTRACT

The present invention relates to methods and arrangements that make CSG cell discovery more resource efficient. That is achieved by providing the UE with accurate and up-to-date knowledge of the physical cell identity (identities) of its allowed CSG cell(s). Accurate knowledge of the PCI of an allowed CSG cell greatly simplifies the search/discovery procedure for this CSG cell, in particular the procedure can be made much more resource efficient and UE battery lifetime can be prolonged.

34 Claims, 7 Drawing Sheets

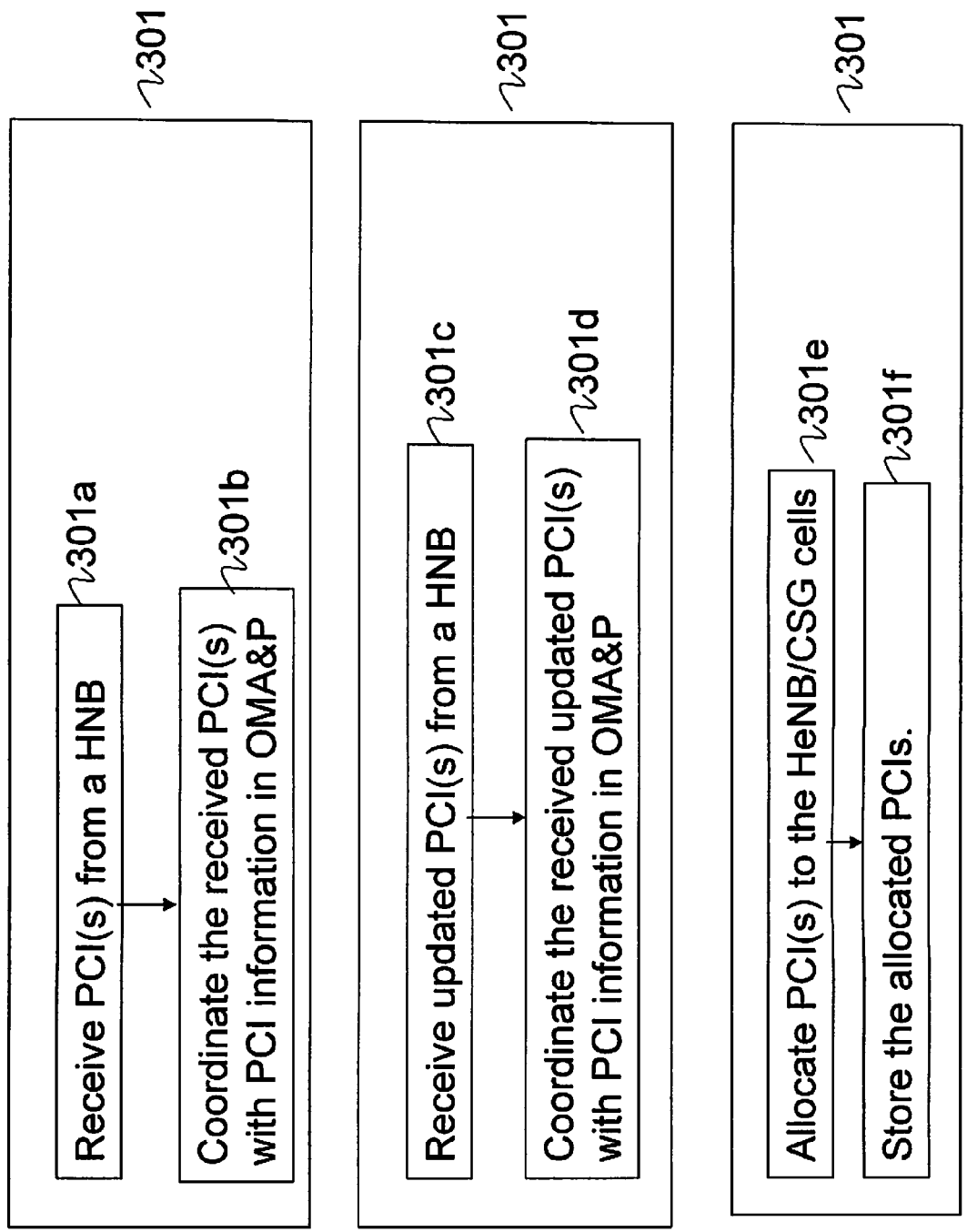

METHOD, APPARATUS, AND SYSTEM FOR DETECTING ALLOWED CLOSED SUBSCRIBER GROUP CELLS (CSG)

TECHNICAL FIELD

The present invention relates to methods and arrangements in a cellular communications network. In particular, it relates to searches for allowed closed subscriber group cells by user equipments.

BACKGROUND

In third generation (3G) Universal Mobile Telecommunications System (UMTS) and in particular in its evolved version Service Architecture Evolution/Long Term Evolution (SAE/LTE), also referred to as Evolved Packet System (EPS), the concept of home base stations is introduced.

In 3G systems a home base station is referred to as a Home Node B (HNB) whereas in EPS it is referred to as a Home eNodeB (HeNB). A cell served by a HNB or a HeNB is commonly referred to as a femtocell. A home base station is assumed to be placed in a private home, utilizing the home owner's fixed broadband connection to access the core network. It is also assumed that the owner of the home base station handles the actual physical installation of the home base station. Hence, the deployment of home base stations cannot be planned, since it is largely outside the control of the operator. Another important property of the home base station concept is the potentially very large number of home base stations.

In the description below, a 3G Home Node B is abbreviated HNB, an EPS/LTE Home eNodeB is abbreviated HeNB and the abbreviation HN is used to denote either a 3G Home Node B or an EPS/LTE Home eNodeB.

A HN connects to the operator's network via a secure tunnel (supposedly IPsec protected) to a security gateway at the border of the operator's network. Via this tunnel the HN connects to the core network nodes of the operator's core network e.g. MME (Mobility Management Entity) and S-GW (Serving Gateway) via the S1 interface in EPS or SGSN (Serving GPRS Support Node) and MSC (Mobile Switching Center) (or MGW (Media Gateway) and MSC server) via the Iu interface in 3G UMTS. A 3GPP (third generation partnership project) operator may also deploy a concentrator node in its core network between the HNs and the regular core network nodes. In the EPS standardization such a concentrator node is commonly referred to as a HeNB Gateway, which may be an optional node in EPS HeNB solutions. The corresponding node name in 3G UMTS standardization is HNB Gateway and this node is mandatory in 3G HNB systems.

For both EPS and 3G UMTS the HN uses a broadband access network as (part of the) transport network. A possible NAT (Network Address Translation) between the HN and the 3GPP network is not a problem for the IPsec tunnel, because IKEv2 (Internet Key Exchange version 2), which can handle NAT traversal (i.e. activate UDP (User Datagram Protocol) encapsulation for ESP (Encapsulated Security Payload) traffic as needed), is assumed to be used for the IPsec tunnel establishment.

Through this setup a UE communicates via the HN and the core network like any other UE.

The HN concept is closely related to the concept of Closed Subscriber Group (CSG). A femtocell is also assumed to be a CSG cell. This means that only a selected group of subscribers, i.e. a closed subscriber group, is allowed to access the network through that cell. The CSG of a CSG cell is identified by a CSG ID, which is broadcast in the cell as a part of the system information. Typically each CSG cell has its own unique CSG ID but it may also be possible to define the same CSG ID for multiple cells, thereby forming a CSG zone, in which the same selected group of subscribers is allowed access. Although a CSG cell in principle does not have to be a femtocell, the two terms are often used as synonyms.

Hence, all subscribers are not allowed to access a certain HN and a certain subscriber is not allowed to access all HNs. Under supervision of the operator the owner of a HN defines which subscribers are allowed to access a femtocell (CSG cell) of the HN (i.e. which subscribers are included in the CSG of the femtocell). This is assumedly done through a web interface (or other "interface" between the HN owner and the operator), and the CSG data or HN access list (which is an equivalent term assuming that the HN only serves one CSG) is stored in a database in the operator's network. The HN owner would assumedly enter the allowed subscribers in the form of ISDN (Integrated Services Digital Network) numbers (Mobile Subscriber ISDN Number, MSISDN) or IMSIs (International Mobile Subscriber Identity) of the concerned subscribers.

The CSG data, or HN access list, is reflected in so-called CSG Whitelists, also known as Allowed CSG Lists, associated with the concerned UEs. Each UE has a CSG Whitelist, which includes the CSG ID of each CSG the UE or more precisely the subscriber using the UE is included in, i.e. the CSG ID of each femtocell the UE (i.e. the subscriber) is allowed to access. (It should be noted that a CSG is actually associated with a group of subscribers rather than UEs, but for simplicity the term UE is also used as the entity of which a CSG is formed in this specification. Similarly, a CSG Whitelist is actually associated with a subscriber—not a UE, but for simplicity the text also uses the UE as a "proxy" for the subscriber using it, such that a CSG Whitelist may be referred to as belonging to the UE and the UE may be said to be allowed or not allowed access to a CSG cell.)

Further, the CSG Whitelist of a subscriber is stored centrally in the operator's network, e.g. in the HSS (Home Subscriber Server) together with other subscriber data or in a special database e.g. denoted Access Control Database (ACDB). The CSG Whitelist is also stored in the UE (e.g. in the USIM (Universal Subscriber Identity Module)), so that the UE itself can determine whether it is allowed to access a certain CSG cell or not (in order to avoid useless access attempts). The CSG Whitelist is transferred from the network to the UE via OMA DM (Open Mobile Alliance Device Management), NAS (Non-Access Stratum) signaling or Over-The-Air (OTA) USIM configuration technology (or SMS (Short Message Service)). Furthermore, in EPS the CSG Whitelist of a UE is downloaded to the MME serving the UE, so that the MME can perform CSG based access control of UEs requesting network access via a CSG cell. This mechanism is likely to be similar in 3G, utilizing a node corresponding to the MME, i.e. the SGSN and/or the MSC (server).

The search for allowed CSG cells is left to the UE to handle autonomously. To identify an allowed CSG cell the UE must read the CSG ID from the system information broadcast in the cell and compare it with the CSG ID(s) stored in its CSG Whitelist. When a match is found the UE has discovered an allowed CSG cell. To make the search for an allowed CSG cell more efficient the UE is assumed to utilize a so-called "fingerprint" of the CSG cell location. The exact mechanisms of such a fingerprint aided cell search are not standardized and will be up to each UE vendor to design. However, typically a fingerprint is obtained by listening to transmissions from the macrocells (i.e. regular non-femto cells) in the area of the allowed CSG cell. Transmissions from both LTE cells, 3G cells and 2G cells may be utilized to form a "signature"/ "fingerprint" of the location of the CSG cell. Transmitted data that may be useful indications include e.g. cell identities (E-CGI (E-UTRAN Cell Global Identity) in EPS and CGI (Cell Global Identity) in 2G/3G), registration area identifiers, such as TAIs (Tracking Area Identities) in EPS, LAIs (Location Area Identities) and RAIs (Routing Area Identity) in 2G/3G and URA (UTRAN registration area) identities in 3G. Other types of radio transmissions could potentially also be used to provide input data to the fingerprint, e.g. WLAN transmissions. The UE learns the fingerprint, i.e. records relevant received data which can be used to identify the location of a CSG cell, when it is present in the cell. Later, when searching for the CSG cell or before searching for the CSG cell the UE scans the radio environment and when it receives an indication of a fingerprint match i.e. sufficiently many of the pieces of data constituting the fingerprint match the received ones, the UE determines that it is worthwhile to check the CSG ID of detected potential CSG cells.

An EPS/LTE identifier that is important in the context of allowed CSG cell discovery is the Physical Cell Identity, PCI. Each cell is assigned one out of 504 possible PCIs. The PCI is broadcast on layer 1 in the cell. Knowledge of the PCI is required in order for a UE to correctly decode any downlink transmission in the cell. Thus, the PCI is used to distinguish cells from each other and to enable decoding of downlink transmissions. Since 504 different PCIs are not enough to give every cell a unique PCI, the PCIs are reused in the radio network. The PCI may however uniquely identify a cell within a restricted location, provided that careful PCI planning is used or other methods to ensure that the PCIs are not too densely reused. Such local uniqueness is utilized when handover candidates are identified and the PCI is hence the only cell identifier that is associated with the measurement reports a UE sends to its serving eNB (eNodeB). However, when femtocells are deployed, many macrocells will have too many femtocells as neighbors for the PCI range to provide uniqueness to the neighboring femtocells. When the PCI is not enough to uniquely identify a cell (e.g. when the PCI is not locally unique or when a UE reports an unknown PCI to the eNB or during idle mode cell (re-)selection), the UE must retrieve the cell's global cell identity (i.e. the PLMN ID+E-CGI in EPS/LTE) from the system information that is broadcast in the cell. (The PLMN ID consists of a Mobile Country Code (MCC) and a Mobile Network Code (MNC)). Retrieving this information is much more time and resource consuming than retrieving the frequently broadcast layer 1 identifier PCI. The global cell identity is broadcast much less frequently (a low-power transmission every 20 ms and the UE soft-combines several such transmissions to safely decode the information) and its reception requires that the UE has first received the PCI and synchronized with the cell's transmissions. Hence, much more time and power is consumed when the UE receives the global cell identity than when receiving only the PCI.

Searching for allowed CSG cell(s) may consume a lot of time and battery power in a UE, especially in an environment with densely deployed femtocells. The retrieval of the CSG ID requires synchronization and reading of the relatively infrequently transmitted system information. Active UEs (i.e. UEs in connected state), have to use natural gaps in the transmission (DRX) to scan for CSG cells and retrieve their CSG IDs instead of saving power. Idle UEs have to receive the system information of detected cells to retrieve the CSG ID (instead of just measuring the reference signal) to be able to appropriately evaluate them for potential cell (re-)selection.

The purpose of the fingerprint concept is to reduce the amount of resources consumed for search and discovery of allowed CSG cell(s) by more or less restricting these procedures to areas in the vicinity of allowed CSG cell(s). However, a problem is that within the area that matches the fingerprint, there may well be numerous (e.g. dozens of) other CSG cells in addition to the allowed CSG cell. Hence, even with use of a good fingerprint the UE may have to go through the complete search and identifier retrieval procedure (including CSG ID retrieval) with many (e.g. dozens of) other CSG cells for every successful discovery of its allowed CSG cell.

There is an obvious risk that unless efficient methods are developed to minimize the resources consumed for CSG cell discovery, UEs which are allowed CSG access (and which consequently will attempt to discover allowed CSG cell(s)) will spend excessive resources on search and discovery of allowed CSG cell(s), so that their battery lifetime (standby time etc.) may be significantly reduced. This is also what early trials imply. Shorter UE battery lifetime for CSG users will be difficult to understand for users and will hardly be perceived as acceptable by either operators or users.

SUMMARY

An objective problem of the present invention is to provide methods and arrangements that make CSG cell discovery more resource efficient.

That is achieved by providing the UE with accurate and up-to-date knowledge of the physical cell identity (identities) of its allowed CSG cell(s). Accurate knowledge of the physical cell identity of an allowed CSG cell greatly simplifies the search/discovery procedure for this CSG cell, in particular the procedure can be made much more resource efficient and UE battery lifetime can be prolonged. The physical cell identity may be a PCI in an LTE system or a scrambling code in a UTRAN system.

When detecting the fingerprint the UE could start searching for the allowed CSG cell, as described above, but for most detected femtocells it would suffice to retrieve the physical cell identity, which is a very swift procedure, to dismiss them as "not allowed". Not until the correct physical cell identity is detected would the UE have to retrieve the CSG ID to verify that it has actually detected its allowed CSG cell. Hence, the UE could avoid the most resource consuming step of the allowed CSG cell search/discovery procedure, i.e. the CSG ID retrieval, for the majority of the detected femtocells.

To provide the UE with knowledge of the physical cell identity (identities) of its allowed CSG cell(s), a set of at least one network node such as OMA&P (Operation, Maintenance, Administration and Provisioning) nodes retrieve physical cell identity information of the CSG cell(s) which the UE is allowed to access and sends to the UE the retrieved physical cell identity information of the CSG cell(s) which the UE is allowed to access.

According to a first aspect of the present invention a method in a UE for identifying cells which the UE is allowed to access is provided. In the method, physical cell identity (identities) of CSG cell(s) which the UE is allowed to access is (are) received. The method comprises the further steps of listening to broadcast information to detect a physical cell identity identical to any of the received Physical cell identity (identities), and when a physical cell identity identical to any of the received physical cell identity (identities) is detected (403) the following steps are performed: Retrieving a CSG ID, of the cell with said physical cell identity, and verifying that the cell with said physical cell identity is a cell that the UE is allowed to access based on the retrieved CSG ID.

According to a second aspect, a method in a set of at least one network node of a mobile telecommunications network for enabling identification of CSG cell(s) allowed to be accessed by a UE is provided. The method comprises the steps of retrieving physical cell identity (identities) of the CSG cell(s) which the UE is allowed to access, and sending to the UE the retrieved physical cell identity (identities) of the CSG cell(s) which the UE is allowed to access.

According to a third aspect, a UE for identifying CSG cells which the UE is allowed to access is provided. The UE comprises a receiver for receiving physical cell identity (identities) of CSG cell(s) which the UE is allowed to access. The receiver is further configured to listen to broadcast information to detect a physical cell identity identical to any of the received physical cell identity (identities). The UE comprises a processor configured to detect when a physical cell identity is identical to any of the received physical cell identity (identities), a retriever for retrieving a CSG ID of the cell with said physical cell identity, and a verifier for verifying that the cell with said physical cell identity is a CSG cell that the UE is allowed to access based on the retrieved CSG ID.

According to a fourth aspect a set of at least one network node of a mobile telecommunications network is provided. The network enables identification of CSG cell(s) allowed to be accessed by a UE. The set of at least one network node comprises a retriever for retrieving physical cell identity (identities) of the CSG cell(s) which the UE is allowed to access, and a transmitter for sending to the UE the retrieved physical cell identity (identities) of the CSG cell(s) which the UE is allowed to access.

According to an embodiment of the present invention, the CSG ID(s) of the allowed CSG cell(s) is (are) associated with the physical cell identity (identities). The association may be stored in the network and in the CSG Whitelist of each affected subscriber. The OMA&P system combines the physical cell identity allocated to the CSG cell with the CSG data (i.e. the definition of the CSG members) that the owner of the home base station has provided and ensures, possibly in cooperation with the HSS, that this is reflected in the CSG Whitelists of the respective CSG members. If the physical cell identity is allocated by the HeNB itself, the HeNB has to transfer the allocated physical cell identity to the OMA&P system to enable this procedure. When such an enhanced CSG Whitelist is transferred to a CSG subscriber's UE and stored in the USIM the improved search and discovery procedure for allowed CSG cells is enabled. Note that the PCI-CSG ID association(s) can also be transferred to the UE independently of the CSG Whitelist as a data that is separate from the CSG Whitelist. If this variant is used, the UE may optionally integrate the received PCI-CSG ID association(s) in the CSG Whitelist stored in the UE. Furthermore, yet an option is to transfer only the relevant physical cell identity (identities) (i.e. the PCI(s) of the CSG cells that the UE is allowed to access) to the UE, without association(s) to CSG ID(s) and independently of and as data separate from the CSG Whitelist. An advantage of providing the association between the physical cell identity (identities) and the CSG ID(s) (instead of just providing the PCI(s) without associations with particular CSG ID(s)) is if the UE/user currently is interested in accessing one or a few of its allowed CSG cells, but not all of them. It is then advantageous to know which PCIs are associated with the CSG IDs of these particular CSG cells.

An advantage of the present invention is that the UE's autonomous search and discovery procedure for allowed CSG cells are made significantly more resource efficient, thereby limiting the excessive battery drainage that may otherwise result from this procedure and hence possibly eliminating a potential show-stopper for successful deployment of Home eNodeBs and Home Node Bs.

A further advantage is that backwards compatibility with legacy UEs is easily arranged, in case the solution is introduced after the initial deployment of Home eNodeBs and/or Home Node Bs.

BRIEF DESCRIPTION OF THE DRAWINGS

FIGS. 3a, 3b and 4 are flowcharts of the methods according to embodiments of the present invention.

DETAILED DESCRIPTION

Figure 1:
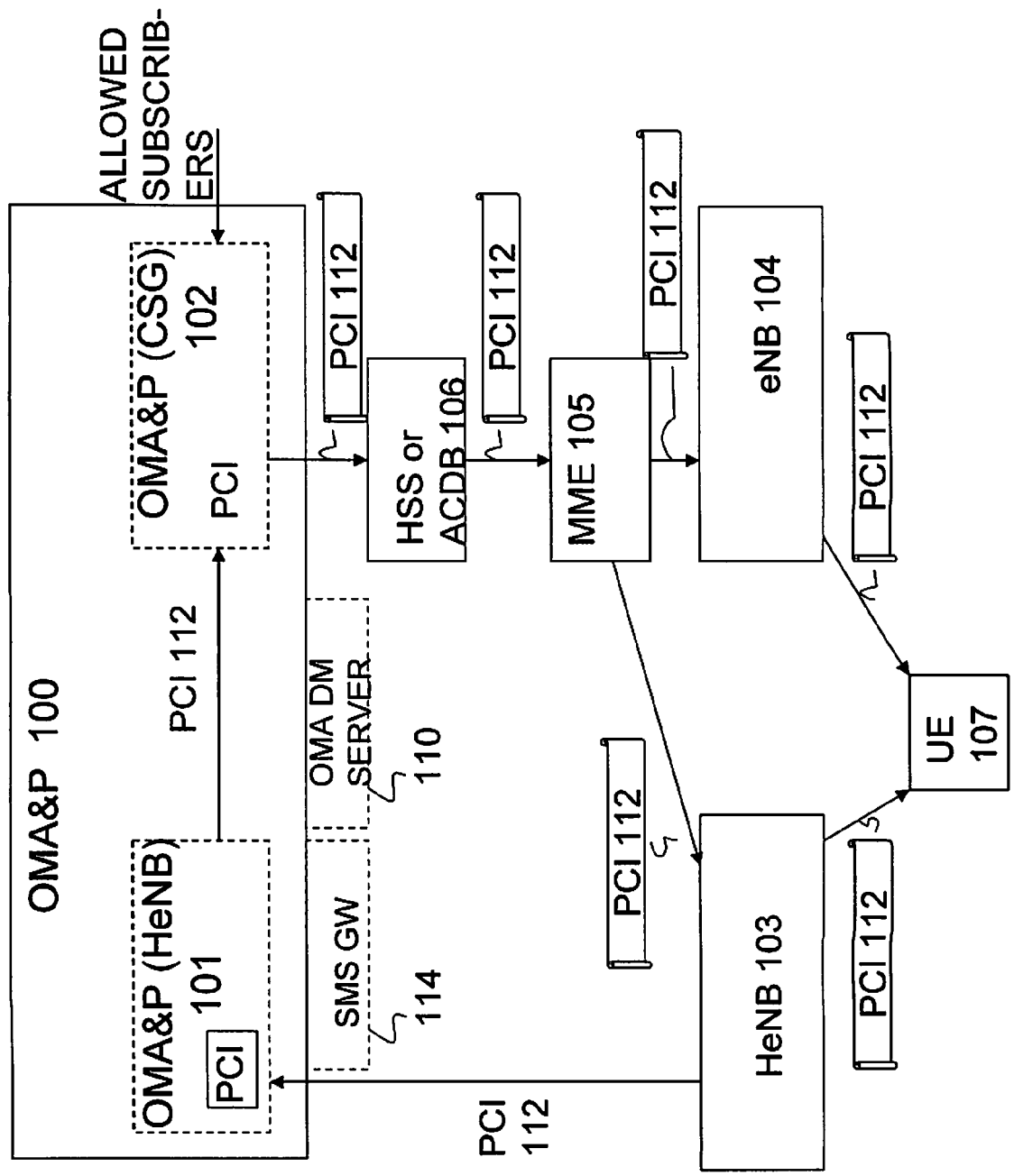
FIG. 1 illustrates a mobile telecommunications system where the present invention is implemented.

The present invention will be described more fully hereinafter with reference to the accompanying drawings, in which preferred embodiments of the invention are shown. The invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like reference signs refer to like elements.

Moreover, those skilled in the art will appreciate that the means and functions explained herein below may be implemented using software functioning in conjunction with a programmed microprocessor or general purpose computer, and/or using an application specific integrated circuit (ASIC). It will also be appreciated that while the current invention is primarily described in the form of methods and devices, the invention may also be embodied in a computer program product as well as a system comprising a computer processor and a memory coupled to the processor, wherein the memory is encoded with one or more programs that may perform the functions disclosed herein.

It should be noted that the embodiments of the present invention can be implemented in any mobile telecommunication network having CSG cells (or similar) identified by CSG IDs (or similar) which are broadcast in the cells and which cells are also identified by lower layer identifiers. These lower layer identifiers are physical cell identifiers referred to as PCIs in EPS/LTE and as scrambling codes in 3G/WCDMA. The physical cell identifiers are also broadcast in the cells, but are more easily (i.e. quicker and with less power consumption) retrieved by a mobile terminal than the CSG IDs. However, the embodiments of the present invention are hereafter exemplified by using the terminology from an EPS/LTE system.

As described above, searching for allowed CSG cell(s) may consume a lot of time and battery power in a UE, especially in an environment with densely deployed femtocells. CSG ID retrieval is very resource consuming since it requires synchronization and reading of the relatively infrequently transmitted system information. Active UEs, i.e. UEs in connected state, have to use natural gaps in the transmission (DRX) to scan for CSG cells and retrieve their PCIs and CSG IDs instead of saving power. Idle UEs have to receive the system information of detected cells to retrieve the CSG ID instead of just the measuring the reference signal to be able to appropriately evaluate them for potential cell (re-)selection as explained above.

In addition to conveying the CSG Whitelist to a UE, which informs the UE of which its allowed CSGs are, the network (e.g. an EPS/LTE network) provides a range of Physical Cell Identities (PCIs) which may be dedicated to femtocells. When searching for an allowed CSG cell, the UE dismisses all cells with PCIs that do not belong to this dedicated range and can thus reduce the set of cells whose CSG IDs it retrieves to the ones whose PCIs belong to the dedicated range.

However, the PCIs are only semi-permanently stable. They may change at any time when PCI collisions are detected e.g. when new cells/(H)eNBs have been deployed. For femtocells this is even more accentuated because the femtocell layer is expected to be much more dynamic than the macrocell layer. HeNB/femtocell deployment is expected to be a much more frequent than deployment of eNBs/macrocells and in addition the femtocells will have fewer PCIs to choose from i.e. the PCIs in the dedicated range for femtocells and hence the PCIs will be more densely reused in the femtocell layer than in the macrocell layer. Furthermore, HeNB are expected to be frequently turned on and off and a new PCI may potentially be allocated to a femtocell each time its HeNB is (auto) configured when it is turned on.

Thus, in accordance with embodiments of the present invention, the UE needs accurate and up-to-date knowledge of the PCI(s) of its allowed CSG cell(s). Accurate knowledge of the PCI of an allowed CSG cell greatly simplifies the search/discovery procedure for this CSG cell, in particular the procedure can be made much more resource efficient and UE battery lifetime can be prolonged. When detecting the fingerprint the UE may start searching for the allowed CSG cell, as described above, but for most detected femtocells it would suffice to retrieve the PCI which is a very swift procedure, since the PCI information is frequently broadcast on layer 1, and then to dismiss them as "not allowed". Not until the correct PCI is detected would the UE have to retrieve the CSG ID to verify that the cell is an allowed CSG cell. Hence, by using the present invention the UE can avoid the most resource consuming step of retrieving the CSG ID for the majority of the detected femtocells.

One way to let a UE know the PCI(s) of allowed CSG cell(s) is to rely on self-learning. That is, when the UE has confirmed detection of an allowed CSG cell, either by using it for idle mode camping or connected mode communication or by merely retrieving its CSG ID and matching the CSG ID with the CSG Whitelist in the UE, the UE stores the PCI together with the CSG ID of the concerned CSG cell. Then the UE could subsequently avoid retrieving the CSG ID of femtocells that have other PCIs than the stored PCI.

However, as mentioned above the PCIs are only semi-permanently stable and can be expected to be less stable for femtocells than for macrocells and may change from time to time. In order not to be locked out from an allowed CSG cell which has changed its PCI because the UE dismisses it as "not allowed" on the basis of the PCI, the UE has to cope with the reality that the PCI may change now and then. One method to deal with this situation is to periodically, although preferably rather infrequently, disregard the stored PCI and retrieve the CSG ID from all detected CSG cells. Another method is to simply let the stored PCI time out and be deleted if it has not been confirmed for a certain period of time. None of these methods may be efficient enough, since most PCI changes of the allowed CSG cell will still pass undetected for some time causing failures to detect the allowed CSG cell before the counter-measure, i.e. override or timeout of the PCI stored in the UE, kicks in.

A more efficient method is, according to the present invention, to send a list of PCIs of the allowed cell to the UE. FIG. 1 illustrates an EPS/LTE network where the UE receives the list of PCIs identifying the cells which the UE is allowed to access.

The illustrated LTE network comprises an OMA&P system 100 divided into a part 101 managing the home base stations (HeNB) (HeNB OMA&P) and one part 102 managing the CSGs (CSG OMA&P). A possible functional division is that the part 101 managing the home base stations (HeNB) takes care of tasks such as configuring the HNs and collecting relevant data from them, while the part 102 managing the CSGs takes care of storage and administration of CSG data, e.g. receiving and storing CSG member data from the HeNB owners, keeping track of temporary (time limited) CSG memberships, etc., and may also be responsible for conveying CSG Whitelists to UEs (depending on which method is used for conveying these lists). These two parts 101, 102 may also be integrated. The OMA&P system 100 is connected to a HSS or an ACDB 106 which stores and manages the CSG whitelists of the subscribers. The HSS or ACDB 106 is further connected to the MME 105 which is connected to the radio access network. In this scenario, the radio access network comprises both macro eNodeBs 104 and home eNodeBs 103. The UE 107 may communicate wirelessly with the HeNB and the eNB. As stated above the network of FIG. 1 is an EPS/LTE network. If the present invention would be implemented in a 3G UMTS network, the HeNB, the eNB and the MME would be replaced respectively by a HNB, a Node B and an SGSN. The HNB would be connected to the SGSN via a HNB GW and the Node B would be connected to the SGSN via a radio network controller (RNC).

Therefore, according to embodiments of the present invention as illustrated in FIG. 1, the OMA&P system 100 retrieves PCI information 112 of the CSG cell(s) which the UE 107 is allowed to access. The OMA&P forwards the retrieved PCI information 112 of said CSG cell(s) to the UE, e.g. via the HSS, MME and the HeNB or the eNB, depending on the location of the UE e.g. by means of NAS signaling. The retrieved PCI information 112 may also be sent to the UE by using an OMA DM server 110 associated with the OMA&P system 100. As a further alternative, the retrieved PCI information 112 may also be sent to the UE by using a SMS gateway 114 associated with the OMA&P system 100. In the case an SMS gateway is used to transmit the PCI information to the UE, Over-The-Air (OTA) USIM configuration mechanisms may be leveraged. An associated OMA DM server or SMS gateway may be integrated with the OMA&P system or may be an entity external to the OMA&P system. In addition to the retrieved PCI information, other relevant HeNB/CSG cell related parameters, e.g. carrier frequency may also be sent to the UE to be used in a subsequent step for searching for allowed CSG cells.

Figure 2:
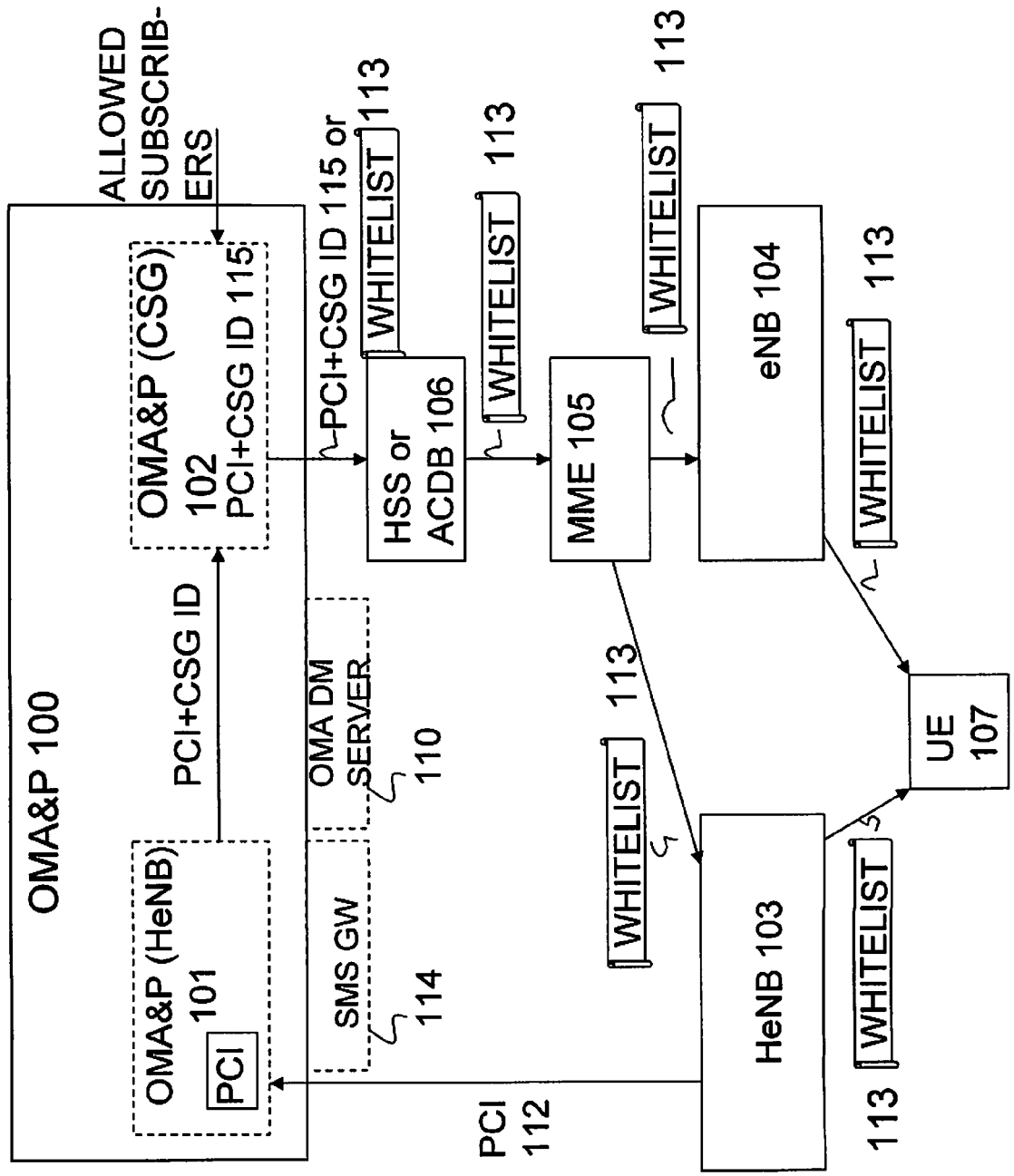
FIG. 2 illustrates a mobile telecommunications system where an embodiment of the present invention is implemented.

Accordingly as illustrated in FIG. 2, the PCI(s) 212 of the CSG cell may be associated with the CSG identity 111 of the CSG cell and the association may be stored in the OMA&P system and together with the corresponding CSG ID e.g. in the CSG Whitelist(s) 113 of the subscriber(s) who is (are) allowed to access the CSG cell, i.e. the subscriber(s) who is (are) included in the CSG. The functionality of the OMA&P system in this context was described above in conjunction with FIG. 1. The associations between the PCIs and CSG IDs can be created in the part 101 managing the home base stations (HeNB) before they are transferred to the part 102 managing the CSGs. If the OMA&P system retrieves the PCI from the HeNB as illustrated in FIG. 2, the PCI-CSG ID association 115 may be created in the HeNB and the OMA&P system may receive also the CSG ID from the HeNB together with the PCI. Alternatively, the OMA&P system, when the HeNB is configured, includes the CSG ID in information that the OMA&P system stores about each HeNB (e.g. in the part 101 managing the HeNBs), so that the OMA&P system can create the PCI-CSG ID association 115. The OMA&P system may also store the PCI and/or the PCI-CSG ID association 115 (e.g. in the part 101 managing the HeNBs or in the part 102 managing the CSGs).

The associations 115 between the PCI(s) and the CSG ID(s) may be sent to the UE in the CSG whitelist 113 as illustrated in FIG. 2. However, the associations 115 may also be sent in a list comprising the associations 115 and possibly other parameters such as the MSISDN(s) independently of the CSG whitelist 113. Moreover, the transmission of the association(s) 115 may be transmitted e.g. by means of NAS signaling. The association(s) 115 may also be sent to the UE by using an OMA DM server 110 associated with the OMA&P system 100 and as a further alternative, the association(s) 115 may also be sent to the UE by using an SMS gateway 114 associated with the OMA&P system 100. In the case an SMS gateway is used to transmit the PCI information to the UE, Over-The-Air (OTA) USIM configuration mechanisms may be leveraged. An associated OMA DM server or SMS gateway may be integrated with the OMA&P system or may be an entity external to the OMA&P system.

There are two possibilities for retrieval of PCI information. That depends on that allocation of PCI to a CSG cell may be carried out in two different ways. The HeNB may itself (auto-)allocate the PCI or the OMA&P system (e.g. the part 101 managing the HeNBs) may allocate the PCI. In the case where the OMA&P system allocates the PCI, the OMA&P system does not need to retrieve the PCI from the HeNB, but can instead retrieve it from an internal storage.

The PCI may be associated with the CSG ID both in the CSG Whitelist copy stored in the network e.g. in the HSS or an Access Control Database (ACDB) and in the CSG Whitelist copy stored in the USIM of the subscriber. However, the PCI would not have to be included in the CSG Whitelist copy that is temporarily stored in the MME for the purpose of CSG access control. The OMA&P system is, in contrast to the HeNB owner, aware of the PCIs, either by allocating and storing the PCI or by receiving the PCIs from the HeNB where the PCI is auto-allocated. Therefore, in the case when the OMA&P system allocates the PCIs, the OMA&P system has to coordinate the PCI from the CSG/femtocell configuration data with the CSG data entered by the HeNB owner (and subsequently with the CSG Whitelists).

The CSG/femtocell configuration data implies data configured for the HeNB and its cells by the OMA&P system, e.g. E-CGI, CSG ID, HeNB IE, TAI, carrier frequency, and handover thresholds. The CSG data implies subscriber identities such as MSISDN for the subscribers that are identified by the HeNB owner as members of the CSGs. This may involve coordination of data from different OMA&P entities/nodes but may also be a more simple coordination effort internally in the same entity/node. An alternative to OMA&P allocation of the PCI is auto-allocation in the HeNB and in such case the HeNB has to inform the OMA&P system of the chosen PCI. In any case the OMA&P system is aware of any PCI changes that occur in a CSG cell, by retrieving updated PCI information, and the OMA&P system can update the CSG data accordingly and also ensure that the affected CSG Whitelist(s) is (are) updated and transferred to the UE of its(their) respective subscriber if the association between the CSG ID and the PCI is included in the CSG Whitelists.

This implies that when the OMA&P system informs the HSS or ACDB about CSG ID-subscriber associations for creation/update of CSG Whiteslists, the PCI of the CSG cell is associated with the CSG ID of the CSG cell, so that the CSG ID-PCI association can be kept in the CSG Whitelist. When the CSG Whitelist, including the CSG ID-PCI association(s), has been conveyed to the UE and stored in the USIM, the UE can use the above described discovery method for allowed CSG cells, i.e. to only search for cells having a CSG ID which is associated with a PCI which identifies an allowed cell.

An alternative approach is that the OMA&P system transfers the PCI to the affected UE(s) (i.e. the UE(s) of the subscriber(s) who is (are) included in the concerned CSG) independently of the CSG Whitelist(s) and ensures that the affected UE(s) is (are) appropriately informed when the PCI changes. Also with this approach similar means as for transfer of CSG Whitelists to UEs can be used for transfer of PCIs to UEs. Transfer means alternatives include OMA DM, NAS signaling, OTA mechanisms and SMS (preferably Secure SMS). OMA DM is a client-server management protocol designed for management of mobile devices. It runs on the application layer of the IP protocol stack and consequently requires IP connectivity between the OMA DM server and the managed device (e.g. a UE acting as OMA DM client). As long as there is IP connectivity between the OMA DM server and the OMA DM client, the OMA DM protocol can be used. NAS signaling is the signaling protocol used between a UE and an MME in EPS/LTE (or between a UE and an SGSN or an MSC/MSC server in 3G/UMTS). OTA (Over-The-Air) mechanisms are mechanisms for configuring data on the USIM in a UE. Typically OTA mechanisms are based on SMS. Secure SMS is regular SMS enhanced with security mechanisms that ensures the integrity of the source of the SMS.

If OMA DM is used, the OMA&P system (e.g. the HeNB OMA&P or CSG OMA&P entity) assumes the role as OMA DM server in the communication with the UEs. Alternatively the OMA&P system may leverage OMA DM server functionality in an OMA&P system external entity to convey the information to the UEs. An OMA&P system external entity with OMA DM server functionality that may be leveraged to convey PCIs to UEs could e.g. be an Access Network Discovery and Selection Function (ANDSF) entity (which is otherwise used to convey policy information related to access network discovery and selection to UEs).

If OTA mechanisms or SMS is used, the OMA&P system (e.g. the HeNB OMA&P or CSG OMA&P) may assume the role as SMS Gateway, but it is also possible that the OMA&P system leverages SMS Gateway functionality of an OMA&P system external entity to convey the information to the UE.

If NAS signaling is used the OMA&P system may possibly insert the information into the HSS to be forwarded to the MME for further forwarding to the UEs via NAS signaling, but the OMA&P system may also transfer the information directly to the MMEs.

Note that all these mechanisms for conveying PCI information from the OMA&P system to the UE can be used for conveying only a list of (at least one) PCI(s) of allowed CSG cell(s) (i.e. without associations to the CSG IDs of the same CSG cells) or for conveying PCI(s) of allowed CSG cell(s) together with the CSG ID(s) of the same CSG cell(s) (i.e. conveying PCI-CSG ID association(s)) or for conveying the CSG Whitelist augmented with the PCI(s) associated with their (its) respective CSG ID in the list. If the CSG Whitelist is not augmented with PCI information, then the OMA&P system need not transfer the PCI(s) or PCI-CSG ID association(s) to the HSS. However, the OMA&P system may optionally still transfer the PCI(s) or PCI-CSG ID association(s) (which is (are) separate from the CSG Whitelist) to the HSS for further transfer to the UE, e.g. via an MME using NAS signaling. If PCI(s) without CSG ID association(s) is (are) transferred to the UE, then the HeNB does not need to transfer the CSG ID to the OMA&P system (which is otherwise an option when HeNB auto-allocation of PCI(s) is used) nor does the HeNB O&M part of the OMA&P system transfer the CSG ID together with each PCI to the CSG O&M part of the OMA&P system. If PCI-CSG ID association(s) is (are) separately transferred to the UE independently of the CSG Whitelist, the UE may optionally integrate the received PCI-CSG ID association(s) in the CSG Whitelist stored in the UE.

If there is no macrocell coverage where a UE is located and the UE can only detect femtocells, the UE may override the PCI restriction and retrieve the CSG ID from all detected femtocells whose transmissions the UE can receive strongly enough. This handles the situation where the UE, due to lack of connectivity because of lack of macrocell coverage and no present femtocell connection, cannot be updated with a changed CSG cell PCI, so that the UE will not incorrectly dismiss detected CSG cells based on a faulty (not up-to-date) perception of what the PCI of the allowed CSG cell should be.

If a CSG zone spans several CSG cells, i.e. if the same CSG ID is associated with multiple cells, then there is no one-to-one mapping between a CSG ID and its PCI. To support such multi-cell CSG zones the methods and arrangements according to embodiments of the present invention support that multiple PCIs are associated with a single CSG ID. This one-to-many association should be allowed both in the CSG data stored in the network and in the CSG Whitelists stored in the network and the UEs.

Furthermore, the fingerprint construction is a trade-off between accuracy and resource efficiency. A simple fingerprint consists of e.g. an E-CGI or a TAI in the LTE macrocell layer. To make the fingerprint more accurately pin-point the location of the allowed CSG cell, LTE parameters may be complemented with parameters from other 3GPP technologies, e.g. cell identities and LAIs, RAIs or URA identities from 2G and 3G networks, and even from non-3GPP technologies such as WLAN (Wireless Local Area Network) or WiMAX (Worldwide Inter-operability for Microwave Access). Although gathering such additional parameters makes the fingerprint more accurate, the actual scanning for the parameters in search for a fingerprint match also consumes more resources in terms of time, e.g. for frequency tuning and waiting for the desired parameters to be transmitted, and battery power. If the accuracy-resource efficiency trade-off goes too far towards accuracy at the expense of resource efficiency, it may actually be more efficient to skip the fingerprint search altogether and rely only on PCI detection. A precondition for this strategy is of course that the UE has accurate knowledge of the PCI to look for, i.e. the PCI of the allowed CSG cell it is searching for (as described above). Continuously checking for this PCI, e.g. during regular neighbor cell scanning and measurements and during regular cell (re-)selection procedure, and retrieving the CSG ID whenever the correct PCI is found may be more resource efficient than scanning for a resource inefficient fingerprint.

Figure 3A:
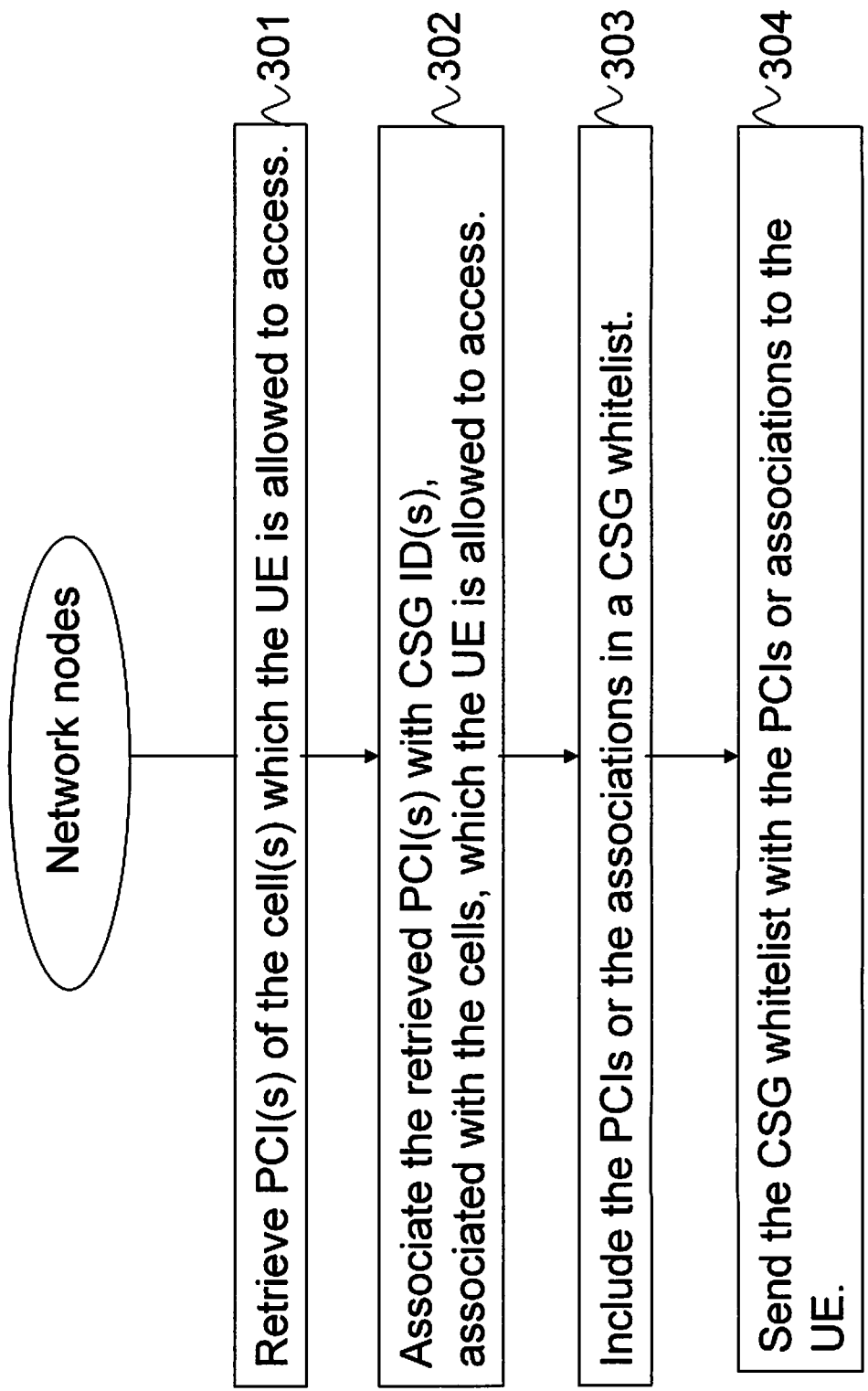

Turning now to FIG. 3a showing a flowchart of a method in a set of at least one network node according to embodiments of the present invention. The method may be implemented in an OMA&P system and comprises the steps of:

Step 301. Retrieve PCI(s) of the CSG cell(s) which the UE is allowed to access.

Step 302. Associate the retrieved PCI(s) with CSG ID(s), associated with the CSG cells, which the UE is allowed to access.

Step 303. Include the PCIs or the associations in a list which contains CSG ID(s) of the CSG cell(s) which the UE is allowed to access, referred to as a CSG whitelist.

Step 304. Send the CSG whitelist with the PCIs or associations to the UE.

As illustrated by the flowcharts of FIG. 3b, the PCIs may be retrieved in different ways.

The retrieving step 301 comprises according to one embodiment when the HeNB allocates the PCIs, the further steps of:

Step 301a: Receive PCI(s) from a HeNB.

Step 301b: Coordinate the received PCI(s) with PCI information already available to the OMA&P system. The already available PCI information may be PCI(s) previously stored in the OMA&P system.

The retrieving step 301 comprises according to a further embodiment when the HeNB allocates the PCIs and the PCIs are reallocated and updated, the further steps of:

Step 301c: Receive updated PCI(s) from a HeNB.

Step 301d: Coordinate the received updated PCI(s) with PCI information already available to the OMA&P system. The already available CSG information may be PCI(s) previously stored in the OMA&P system.

The retrieving step 301 comprises according to a further embodiment when the set of at least one network node allocates the PCIs, the further steps of:

301e: Allocate PCI(s) to the HeNB/CSG cells.

301f: Store the allocated PCIs.

Figure 4:
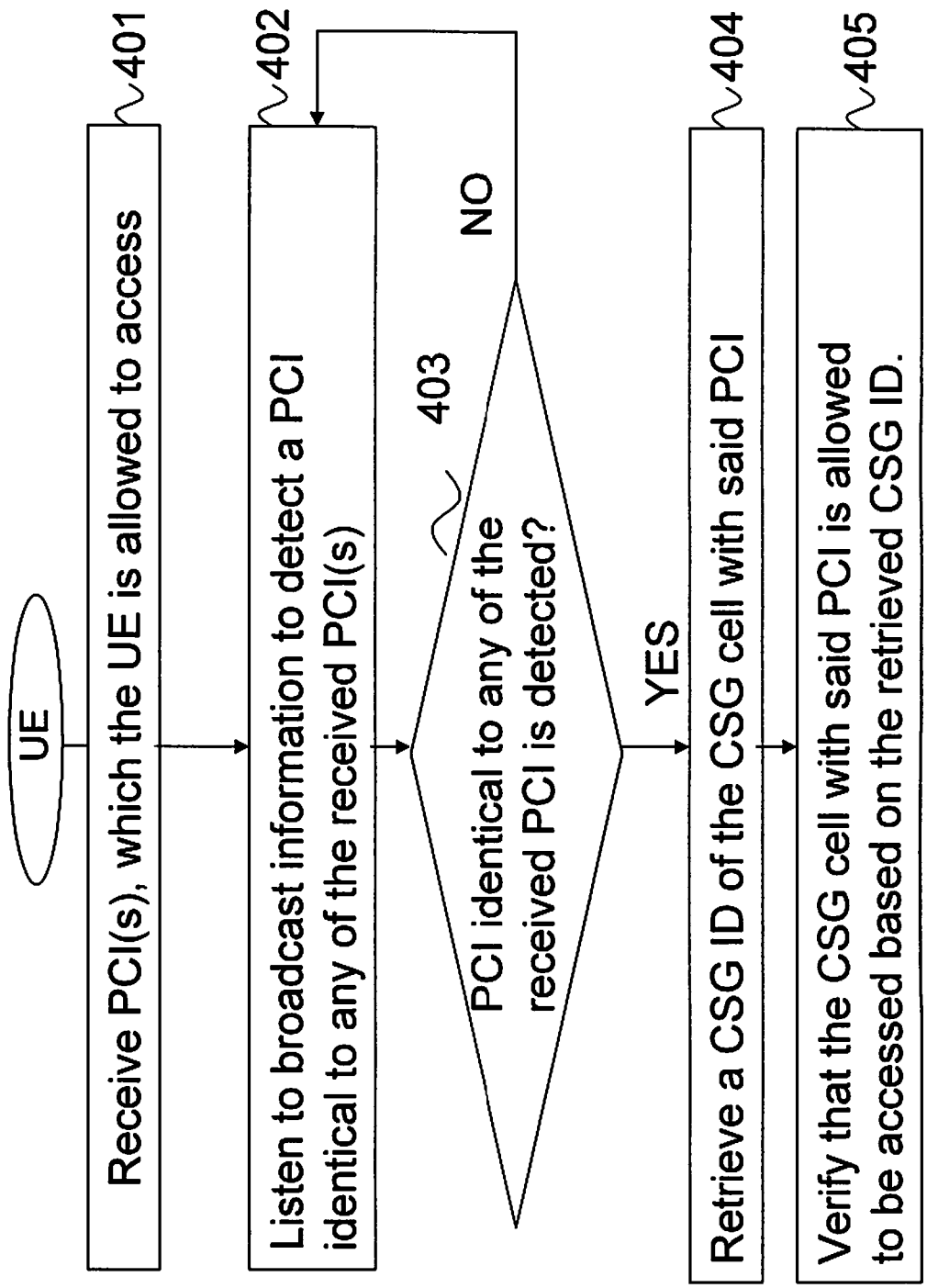

Turning now to FIG. 4 showing a flowchart of a method in a UE according to embodiments of the present invention. In step 401 PCI(s) of CSG cells which the UE is allowed to access is (are) received from the set of at least one network node, in step 402 the UE listens to broadcast information to detect a PCI identical to any of the received PCI(s). When a PCI identical to any of the received PCI(s) is detected 403, steps 404 and 405 are performed which involves retrieving 404 a CSG ID of the cell with said PCI, and verifying 405 that the cell with said PCI is allowed to access based on the retrieved CSG ID.

Figure 5:
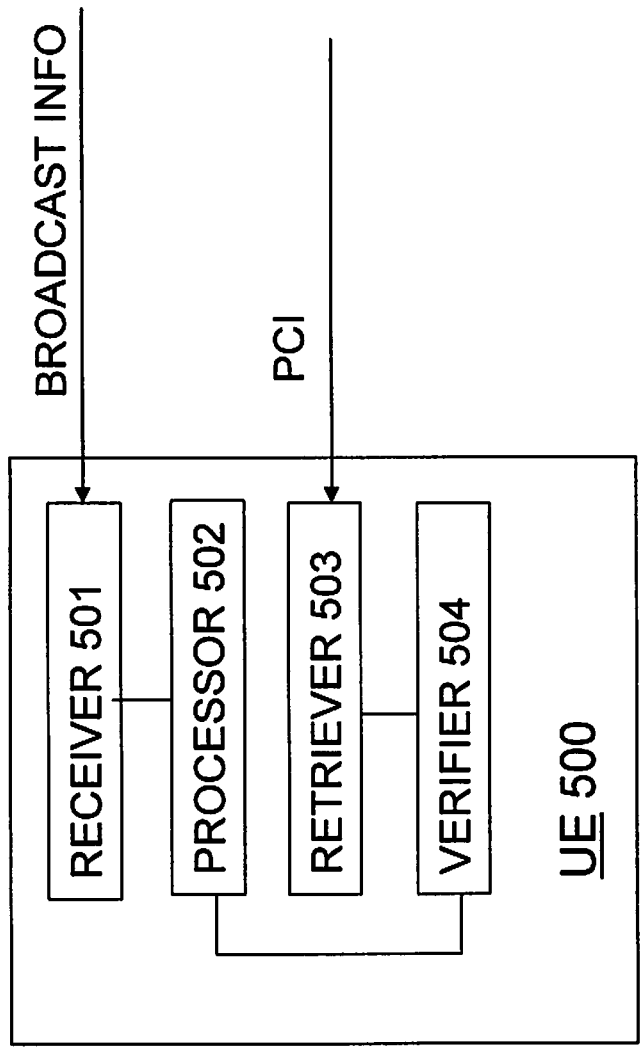
FIGS. 5 and 6 illustrate schematically the network node and the UE according to embodiments of the present invention.

Accordingly, the UE comprises as schematically illustrated in FIG. 5 a receiver 501 for receiving PCI(s) of CSG cell(s) which the UE is allowed to access. The receiver is further configured to listen to broadcast information to detect a PCI identical to any of the received PCI(s). Moreover, the UE comprises a processor 502 configured to detect when a PCI is identical to any of the received PCI(s), a retriever 503 for retrieving a CSG ID of the CSG cell with said PCI, and a verifier 504 for verifying that the cell with said PCI is a cell which the UE is allowed to access based on the retrieved CSG ID.

The receiver 501 may be configured to receive the PCI(s) via OMA DM functionality, OTA USIM configuration functionality, SMS or NAS signaling. As described above, association(s) between the PCI(s) and the CSG ID(s) associated with the CSG cells which the UE is allowed to access may be performed in the network. Therefore, the receiver 501 may be configured to receive the association(s) between the PCI(s) and the CSG ID(s) and the associations may be included in a CSG whitelist.

Figure 6:
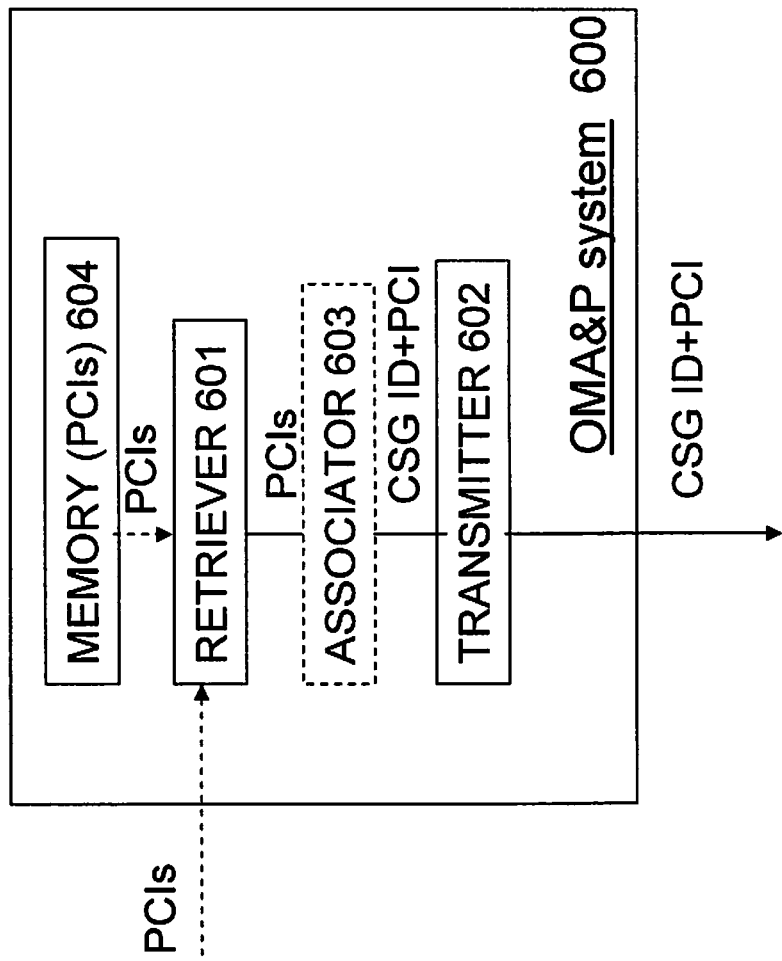

Moreover, as schematically illustrated in FIG. 6, a set of at least one network node 100 comprises a retriever 601 for retrieving PCI(s) of the CSG cell(s) which the UE is allowed to access, and a transmitter 602 for sending to the UE the retrieved PCI(s) of the CSG cell(s) which the UE is allowed to access, e.g. by using OMA DM functionality, OTA USIM functionality, SMS or NAS signaling. In all cases the set of at least one network node may leverage one or more other nodes or entities for sending the received PCI(s) to the UE, such that the transmitter 602 may send said PCI(s) to the UE e.g. via a HSS, an ACDB, an MME, an OMA DM server and/or an SMS Gateway. The set of at least one network node may comprise the OMA&P nodes 100, 101, 102 of FIG. 2.

Furthermore, the set of at least one network node comprises an associator 603 for associating the retrieved PCI(s) with CSG ID(s) associated with the CSG cells, which the UE is allowed to access, and the transmitter (602) is further configured to send said association(s) to the UE. One PCI may be associated with a plurality of CSG IDs or multiple PCIs are associated with one single CSG ID.

In addition, the set of at least one network node may be configured to include said PCI(s) in a CSG Whitelist, and the transmitter is then configured to send the CSG Whitelist.

As described above, the set of at least one network node 100 may be an OMA&P system comprising an OMA&P 101 for the HeNB and an OMA&P 102 for CSG. Hence, the OMA&P 101 for the HeNB may comprise the retriever 601, the memory 604 and the associator 603 and the OMA&P 102 for the CSG may comprise the transmitter 602.

According to embodiments of the present invention, the retriever 601 can retrieve the PCI information in different ways. The retriever 601 may be configured to receive PCI(s), e.g. updated PCI(s) from a HeNB and to coordinate the received PCI(s) with physical cell identity information already available to the set of at least one network node. If the set of at least one network node is responsible for allocating the PCI(s), the retriever is configured to allocate PCI(s) to the HeNB/CSG cells and the PCI(s) can then be retrieved from e.g. a memory 604 in the OMA&P system.

In many aspects the HNB related specifications for 3G UMTS are more mature than the HeNB related specifications for EPS, but regarding the CSG and CSG Whitelist concepts the 3G HNB standardization lags behind the HeNB standardization. However, corresponding concepts are planned to be standardized also for 3G HNBs. When these features are in place, the above described solution will be applicable also to the 3G HNB standard, but with the PCI of an LTE CSG cell replaced by the WCDMA scramble code of a 3G/WCDMA CSG cell.

If a UE is not prepared to handle PCIs in the CSG Whitelist, then the network should not send a CSG Whitelist with PCIs to this UE. Instead, one way to build backwards compatibility into the mechanism is to not include the PCI(s) into the CSG Whitelist sent to the UE, but to send it (them) to the UE as a separate CSG ID-PCI association table and leave the CSG Whitelist format unchanged. If this variant is used, the UE may optionally integrate the received PCI-CSG ID association(s) in the CSG Whitelist stored in the UE. The network could also send a separate list of only PCI(s) (of allowed CSG cells) without associations to CSG IDs. If the UE does not support CSG ID-PCI associations or PCI lists, it will either discard this information or ignore it as useless data in the USIM.

Another way to deal with legacy mobile terminals is to utilize the UE capabilities information features that are built into the 3GPP systems. If the CSG Whitelist is conveyed to the UE via NAS signaling, then the UE Network Capability Information Element in the NAS Attach Request message can be used to inform the MME of whether the UE supports CSG ID-PCI associations in the CSG Whitelist. If not, the MME sends a CSG Whitelist without PCI(s) to the UE. Similarly, if a separate CSG ID-PCI association table is sent to the UE via NAS signaling, then the UE Network Capability Information Element in the NAS Attach Request message can be used to inform the MME of whether the UE supports the CSG ID-PCI association table feature. If not, the MME does not send any CSG ID-PCI association table to the UE. Likewise, if a separate PCI list (without association(s) with CSG ID(s)) is sent to the UE via NAS signaling, then the UE Network Capability Information Element in the NAS Attach Request message can be used to inform the MME of whether the UE supports the PCI list feature. If not, the MME does not send any PCI list to the UE.

An alternative way to deal with backwards compatibility is to upgrade legacy mobile terminals via Over-The-Air software upgrades (or other online upgrade mechanisms), so that they support CSG Whitelists with PCIs or separate CSG ID-PCI associations or separate PCIs and preferably also support the search and discovery mechanism for allowed CSG cells according to the embodiments of the present invention.

It should therefore be noted, that even if the terms HeNB and PCI are used in the description of the embodiments of the present invention, the present invention is also applicable to HNBs and scrambling codes (which is a physical cell identity) in 3G UMTS.

The present invention is not limited to the above-described preferred embodiments. Various alternatives, modifications and equivalents may be used. Therefore, the above embodiments should not be taken as limiting the scope of the invention, which is defined by the appending claims.

The invention claimed is:

1. A method in a User Equipment (UE) for detecting Closed Subscriber Group (CSG) cells which the UE is allowed to access, the method comprising:
   receiving one or more physical cell identities and one or more CSG identities of one or more allowed CSG cells, wherein the UE is allowed access to an allowed CSG cell;
   reading broadcast information that is transmitted from each of one or more detected CSG cells and that indicates the one or more physical cell identities of the one or more detected CSG cells;
   deferring retrieval of a CSG identity of a detected CSG cell until after reading broadcast information transmitted from the detected CSG cell indicating a physical cell identity identical to one of the received physical cell identities of the one or more allowed CSG cells; and
   upon the deferred retrieval of the CSG identity of the detected CSG cell, verifying that the detected CSG cell is a cell that the UE is allowed to access by verifying that the retrieved CSG identity is identical to one of the received CSG identities of the one or more allowed CSG cells.

2. The method according to claim 1, wherein the one or more physical cell identities are received via Open Mobile Alliance (OMA) Device Management (DM), Over-The-Air (OTA) Universal Subscriber Identity Module (USIM) configuration, Short Message Service (SMS), or Non-Access Stratum (NAS) signaling.

3. The method according to claim 1, wherein receiving the one or more physical cell identities further comprises receiving associations between the one or more physical cell identities and the one or more CSG identities associated with the allowed CSG cells.

4. The method according to claim 1, wherein the one or more received physical cell identities are included in a list which contains the CSG identities of the allowed CSG cells.

5. The method according to claim 1, wherein one physical cell identity is associated with a plurality of CSG identities.

6. The method according to claim 1, wherein multiple physical cell identities are associated with one single CSG identity.

7. A method in a system for enabling detection of one or more allowed closed subscriber group (CSG) cells that are allowed to be accessed by a User Equipment (UE) wherein the system includes a set of one or more network nodes of a mobile telecommunications network, the method comprising:
retrieving one or more physical cell identities of the one or more allowed CSG cells; and
assisting the UE to defer retrieval of a CSG identity of a detected CSG cell until after the UE reads broadcast information transmitted from the detected CSG cell indicating that the detected CSG cell has a physical cell identity identical to one of the retrieved physical cell identities, by sending the retrieved physical cell identities to the UE;
wherein said assisting comprises assisting the UE that, upon the deferred retrieval of the CSG identity of the detected CSG cell, is configured to verify that the detected CSG cell is a cell that the UE is allowed to access by verifying that the retrieved CSG identity is identical to one of one or more CSG identities of the one or more allowed CSG cells.

8. The method according to claim 7, wherein said sending comprises transferring the retrieved physical cell identities to the UE via Open Mobile Alliance (OMA) Device Management (DM), Over-The-Air (OTA) Universal Subscriber Identity Module (USIM) configuration, Short Message Service (SMS), or Non-Access Stratum (NAS) signaling.

9. The method according to claim 7, further comprising associating the retrieved physical cell identities with CSG identifies of the one or more allowed CSG cells, and wherein sending the retrieved physical cell identities to the UE comprises sending said associations to the UE.

10. The method according to claim 7, wherein said sending comprises sending the retrieved physical cell identities to the UE via a Home Subscriber Server (HSS).

11. The method according to claim 7, wherein said sending comprises sending the retrieved physical cell identities to the UE via an Access Control Database (ACDB).

12. The method according to claim 7, further comprising including said one or more physical cell identities in a list which contains CSG identifies of the one or more allowed CSG cells, and wherein sending the retrieved physical cell identities comprises sending the retrieved physical cell identities to the UE in the list.

13. The method according to claim 7, wherein said retrieving comprises:
receiving a physical cell identity from a home base station, and
coordinating the received physical cell identity with physical cell identity information already available to said system.

14. The method according to claim 7, wherein said retrieving comprises:
receiving one or more updated physical cell identities, and
coordinating the received updated physical cell identities with physical cell identity information already available to said system.

15. The method according to claim 7, wherein said retrieving comprises:
allocating one or more physical cell identities to the one or more allowed CSG cells, and
storing the allocated physical cell identities.

16. The method according to claim 7, wherein one physical cell identity is associated with a plurality of CSG identities.

17. The method according to claim 7, wherein multiple physical cell identities are associated with one single CSG identities.

18. A User Equipment (UE) configured to detect Closed Subscriber Group (CSG) cells which the UE is allowed to access, the UE comprising:
a receiver configured to:
receive one or more physical cell identities and one or more CSG identities of one or more allowed CSG cells, wherein the UE is allowed access to an allowed CSG cell; and
read broadcast information that is transmitted from each of one or more detected CSG cells and that indicates the one or more physical cell identities of the one or more detected CSG cells;
a processor configured to detect when the broadcast information indicates a physical cell identity identical to one of the received physical cell identities of the allowed CSG cells;
a retriever circuit configured to defer retrieval of a CSG identity of a detected CSG cell until after the processor reads broadcast information transmitted from that detected CSG cell indicating a physical cell identity identical to one of the received physical cell identities of the one or more allowed CSG cells; and
a verifier circuit configured to, upon the deferred retrieval of the CSG identity of the detected CSG cell, verify that the detected CSG cell is a cell that the UE is allowed to access by verifying that the retrieved CSG identity is identical to one of the of the received CSG identities of the one or more allowed CSG cells.

19. The UE according to claim 18, wherein the receiver is configured to receive the one or more physical cell identities via Open Mobile Alliance (OMA) Device Management (DM), Over-The-Air (OTA) Universal Subscriber Identity Module (USIM) configuration, Short Message Service (SMS), or Non-Access Stratum (NAS) signaling.

20. The UE according to claim 18, wherein the receiver configured to receive the one or more physical cell identities by receiving associations between those physical cell identities and the one or more CSG identities associated with the allowed CSG cells.

21. The UE according to claim 18, wherein the receiver is configured to receive the one or more physical cell identities included in a list which contains the one or more CSG identities of the allowed CSG cells.

22. The UE according to claim 18, wherein one physical cell identity is associated with a plurality of CSG identities.

23. The UE according to claim 18, wherein multiple physical cell identities are associated with one single CSG identity.

24. A system that includes a set of one or more network nodes of a mobile telecommunications network and that is configured to enable detection of allowed Closed Subscriber Group (CSG) cells that are allowed to be accessed by a User Equipment (UE), wherein the system comprises a retriever circuit configured to retrieve one or more physical cell identities of the allowed CSG cells, and a transmitter configured to assist the UE to defer retrieval of a CSG identity of a detected CSG cell until after the UE reads broadcast information transmitted from that detected CSG cell indicating that the detected CSG cell has a physical cell identity identical to one of the retrieved physical cell identities, by sending the retrieved physical cell identities to the UE, wherein the UE that is assisted is configured, upon the deferred retrieval of the CSG identity of the detected CSG cell, to verify that the detected CSG cell is a cell that the UE is allowed to access by verifying that the retrieved CSG identity is identical to one of one or more CSG identities of the one or more allowed CSG cells.

25. The system according to claim 24, wherein the transmitter is configured to transfer the retrieved physical cell identities to the UE via Open Mobile Alliance (OMA) Device Management (DM), Over-The-Air (OTA) Universal Subscriber Identity Module (USIM) configuration, Short Message Service (SMS), or Non-Access Stratum (NAS) signaling.

26. The system according to claim 24, further comprising an associator circuit configured to associate the retrieved physical cell identities with CSG identifies of the one or more allowed CSG cells, and wherein the transmitter is configured to send the retrieved physical cell identities to the UE by sending said associations to the UE.

27. The system according to claim 24, wherein the transmitter is configured to send the retrieved physical cell identities to the UE via a Home Subscriber Server (HSS).

28. The system according to claim 24, wherein the transmitter is configured to send the retrieved physical cell identities to the UE via an Access Control Database (ACDB).

29. The system according to claim 24, wherein the system is configured to include said physical cell identities in a list which contains CSG identities of the allowed CSG cells, and wherein the transmitter is configured to send the retrieved physical cell identities to the UE by sending the list to the UE.

30. The system according to claim 24, wherein the retriever circuit is further configured to receive physical cell identities from a home base station, and to coordinate the received physical cell identities with physical cell identity information already available to the system.

31. The system according to claim 24, wherein the retriever circuit is further configured to receive one or more updated physical cell identities, and to coordinate the received updated physical cell identities with physical cell identity information already available to the system.

32. The system according to claim 24, wherein the retriever circuit is further configured to allocate physical cell identities to the one or more allowed CSG cells, and wherein the system further comprises a memory for storing the allocated physical cell identities.

33. The system according to claim 24, further comprising an associator circuit configured to associate one physical cell identity with a plurality of CSG identities.

34. The system according to claim 24, further comprising an associator circuit configured to associate multiple physical cell identities with one single CSG identity.

* * * * *

UNITED STATES PATENT AND TRADEMARK OFFICE
CERTIFICATE OF CORRECTION

| | |
|---|---|
| PATENT NO. | : 8,862,099 B2 |
| APPLICATION NO. | : 13/260024 |
| DATED | : October 14, 2014 |
| INVENTOR(S) | : Rune |

It is certified that error appears in the above-identified patent and that said Letters Patent is hereby corrected as shown below:

In the Claims

Column 16, Line 33, Claim 18, delete "of the of the" and insert -- of the --, therefor.

Signed and Sealed this
Second Day of June, 2015

Michelle K. Lee
*Director of the United States Patent and Trademark Office*